July 18, 1967 C. I. WASSERMAN Re. 26,240

HIGH SPEED PRINTERS WITH COLUMN SPANNING HAMMERS

Original Filed Nov. 25, 1960 3 Sheets-Sheet 1

INVENTOR
CARL I. WASSERMAN

BY Alfred W. Barber
ATTORNEY

HIGH SPEED PRINTERS WITH COLUMN SPANNING HAMMERS

Original Filed Nov. 25, 1960 3 Sheets-Sheet 2

INVENTOR
CARL I. WASSERMAN

BY Alfred W. Barber
ATTORNEY

HIGH SPEED PRINTERS WITH COLUMN SPANNING HAMMERS

Original Filed Nov. 25, 1960 3 Sheets-Sheet 3

INVENTOR
CARL I. WASSERMAN

BY Alfred W. Barber
ATTORNEY

United States Patent Office

Re. 26,240
Reissued July 18, 1967

26,240
HIGH SPEED PRINTERS WITH COLUMN SPANNING HAMMERS

Carl I. Wasserman, 85—49 213th St.,
Queens Village, N.Y. 11427

Original No. 3,220,343, dated Nov. 30, 1965, Ser. No. 71,640, Nov. 25, 1960. Application for reissue Jan. 3, 1966, Ser. No. 523,832
(Filed under Rule 47(b) and 35 U.S.C. 118)
13 Claims. (Cl. 101—93)

Matter enclosed in heavy brackets [ ] appears in the original patent but forms no part of this reissue specification; matter printed in italics indicates the additions made by reissue.

The present invention concerns high speed printers and, in particular, rotating type drum printers and the like.

There are many applications for high speed printers. Electronic computers, for example, utilize high speed printers for printing out various types of information. One type of printer which may be operated at high speed in keeping with the requirements met in electronic computer systems utilizes a drum carrying type faces which are printed on pressure sensitive paper by means of fast acting magnetically actuated hammers. The type on the drum is arranged in columns and a printing hammer is provided for each column of type. The number of columns utilized is determined by the number of characters to be printed per line on the paper. The type drum is rotated continuously and printing is accomplished by actuating the printing hammers during very short time periods during which a given type character is at a desired printing position. Various timing circuits, counters, gates and power sources are utilized in the logical circuits of such a printer.

It has been found according to the present invention that a considerable saving can be accomplished in such a printing system, if the number of hammers is reduced by making one hammer span more than one column of type, by moving the hammers between two or more columns or by utilizing column spanning hammers and moving them as well. When each hammer spans two columns of type, only half as many hammers, hammer drive circuits and a number of circuit devices are required and when each hammer spans N columns, only 1/n of these items are required. The optimum number of columns spanned per hammer will depend on a number of factors which need not be discussed here. It has also been found that the column spanning hammers with or without lateral movement are of considerable application and advantage in a system in which the type characters are carried by an endless belt and moved along the line of hammers.

Accordingly one object of the present invention is to simplify and reduce the cost of printers utilizing continuously rotated type drums and in-line printing hammers.

Another object is to provide methods of and means for utilizing column spanning hammers in a printer utilizing a continuously rotated type drum.

Still another object is to provide methods of and means for utilizing hammers which are moved laterally between columns in a printer utilizing a continuously rotated type drum.

A further object is to combine column spanning with movement in the hammer system of a drum printer.

A still further object is to utilize a type belt in conjunction with column spanning or movable hammers or both.

These and other objects of the present invention will be apparent from the detailed description of the invention given in connection with the various figures of the drawing.

Figure 1:
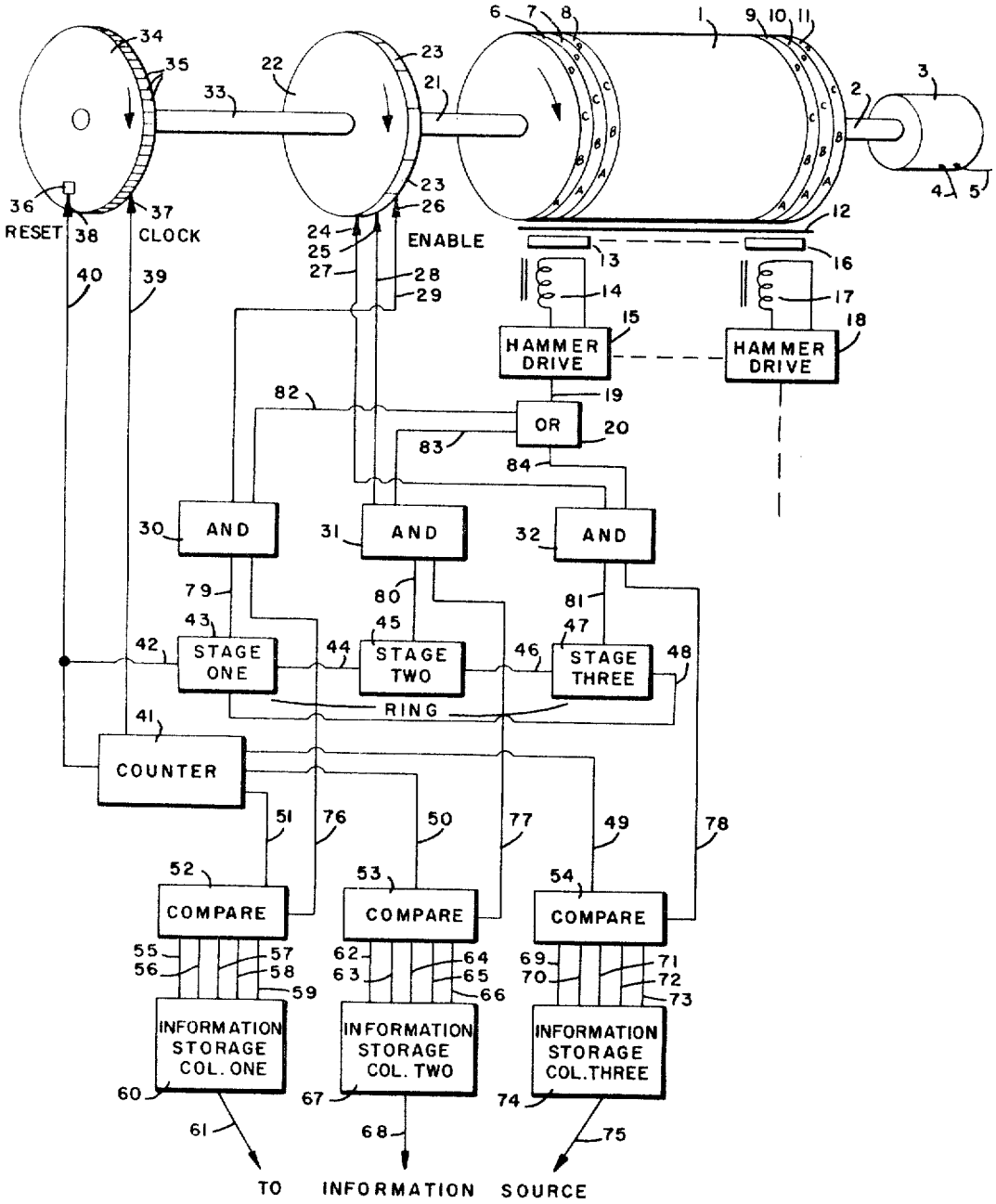
FIG. 1 shows a system utilizing column spanning hammers and a type drum.

FIG. 1 shows a type drum 1 carrying [rows] *columns* of type 6, 7 and 8 through 9, 10 and 11. Each of these [rows] *columns* contains a complete complement as, for example, the alphabet plus numerals from 1 through 9 and 0. These [rows] *columns* of characters are staggered so that a printing hammer such as 13 can strike only one character at a time. Thus, if hammer 13 spans three columns of characters, the characters are staggered to take three different circumferential positions and are then repeated to form groups of three along the drum. The first and last such groupings of three staggered columns only are shown as it will be understood that intermediate groupings are similar. Drum 1 is mounted on a suitable shaft 2 and rotated continuously by motor 3 receiving power over leads 4 and 5. The rotation of drum 1 is accompanied by the rotation of a hammer tone wheel 22 turned by shaft 21 and clock tone wheel 34 turned by shaft 33. The printing from type drum 1 is carried out on a suitable medium such as pressure sensitive paper 12 by means of a row of three column hammers the first of which 13 and the last of which 16 only are shown since all those in between are similar. Hammer 13 is actuated by a hammer solenoid 14 (see FIG. 5 for more details) powered from hammer drive power source 15.

While considerable variations in the logical circuits are possible, one possible arrangement includes utilizing pulses generated by clock tone wheel 34 having contact segments 35 and fixed contact 37. Pulses thus generated are applied over lead 39 to counter 41 which receives one pulse from clock tone wheel 34 for each character on drum 1 passing the hammer line. A reset contact 36, which contacts fixed contact 38, transmits a resetting pulse over lead 40 to counter 41 in order to reset the counter. This reset contact 36 is phased with the characters on drum 1 so that counting starts with the start of the character sequence or at some predetermined point in the sequence. Thus, the count in the counter 41 at any time represents the type drum character in the vicinity of the hammer line. This character representative count in counter 41 is applied to comparators 52, 53, 54, etc. over leads 51, 50, and 49 respectively. An additional comparator, not shown, is provided for each column of characters on type drum 1. Information to be printed in column one is applied from its source over lead 61 to storage 60 which is coupled to comparator 52 over leads 55, 56, 57, 58 and 59, with one lead for each code digit in the character code representing the character to be printed. Similarly, information to be printed in column two is applied to storage 67 over lead 68 and storage 67 is connected to comparator 53 over code leads 62, 63, 64, 65 and 66. In the same manner information for column three is applied over lead 75 to storage 74 which in turn is connected to comparator 54 over leads 69, 70, 71, 72 and 73. In a similar manner information for each character column is stored and compared. When a match is found between the count in counter 41 and the stored information, a pulse is emitted over a corresponding one of leads 76, 77, 78 etc. to the connected "and" gate 30, 31, 32 etc. A second signal is supplied to these "and" gates from ring counter 43, 45, 47 etc. which are interconnected by leads 44, 46 and return 48 and are pulsed once for each revolution of drum 1 by reset contact 36 over leads 40 and 42. The first revolution of drum 1 is carried out with stage one so that "and" gate 30 receives a signal over lead 79. If at this time a signal is also being received over lead 76 indicated that a character is to be printed in column one, the hammer drive source 15 is activated over lead 82, through OR circuit 20 and over lead 19 in response to the timing provided by one of segments 23 of hammer timing wheel 22 contacting contactor 26 and sending a hammer timing signal over lead 29 to "and" circuit 30 at the proper instant for printing. To repeat the sequence, a character representation to be printed is loaded into storage 60 which finds a match in comparator 52 and a signal indicating this fact is applied to "and" gate 30. Since ring stage one 43 is on, "and" gate 30 receives a second signal and printing is completed when a timed enable signal is applied over lead 29 producing an "and" gate response over lead 82 to activate hammer drive 15. Similar sequences are produced for all the other columns of characters on drum 1. Upon the next revolution of clock wheel 34, a reset pulse from contact 36 shifts the ring counter on condition to stage two 45 which signals "and" gate 31 over lead 80. The enable pulse from hammer tone wheel 22 is picked up by the contact 25 over lead 28. Contact 25 is spaced from contact 26 by the same angular distance as the stagger distance between characters in columns 6 and 7 etc. in order to preserve the timing function provided by hammer tone wheel 22. Three coincident signals to "and" gate 31 provide a print instruction over lead 83, OR gate 20 and lead 19 to hammer drive 15 causing hammer 13 to print a predetermined character in column 7. In the same manner all the other columns are printed, column three, for example, being printed in response to activation of "and" gate 32 including an enable signal from contact 24 over lead 27, ring stage 47 over lead 81 and over its output lead 84.

Figure 2:
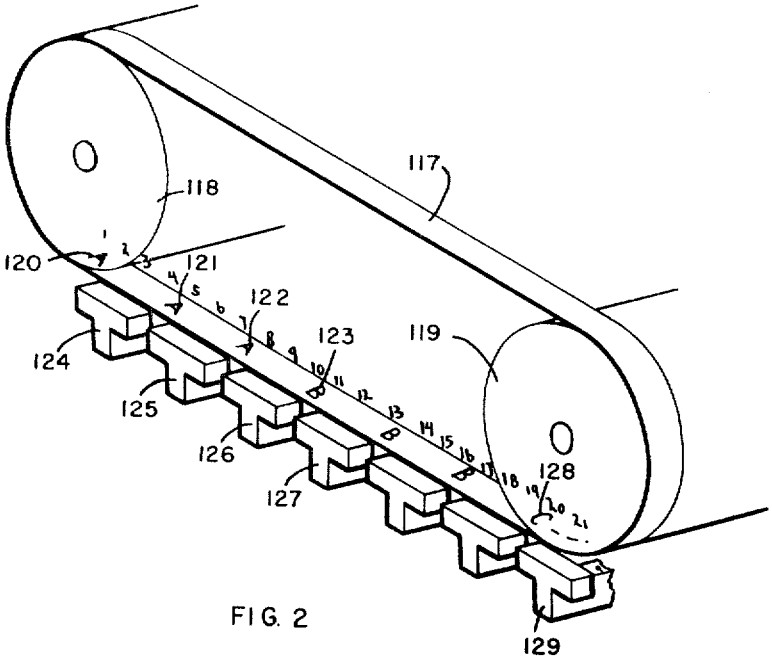
FIG. 2 shows a type belt or chain in combination with column spanning hammers.

FIG. 2 shows how column spanning hammers may be utilized in a system in which the characters are carried by a belt or chain along a line parallel to a line passing through the aligned printing hammers. Here a chain or belt 117 passing around wheels 118 and 119, one of which may be a drive wheel and the other merely an idler carries type characters 120, 121, 122, 123, through 128 which are repeated a number of times equal to the character space span of one hammer and spaced by the width of one hammer. In other words if each of hammers 124, 125, 126, 127 through 129 spans three character spaces, each character is placed three spaces apart and is repeated three times. While details will not be shown or described, this arrangement is made for the purpose of simplifying the logical circuits and apparatus required for printing which in many ways is similar to that which has been shown and described in connection with FIG. 1.

Figure 3:
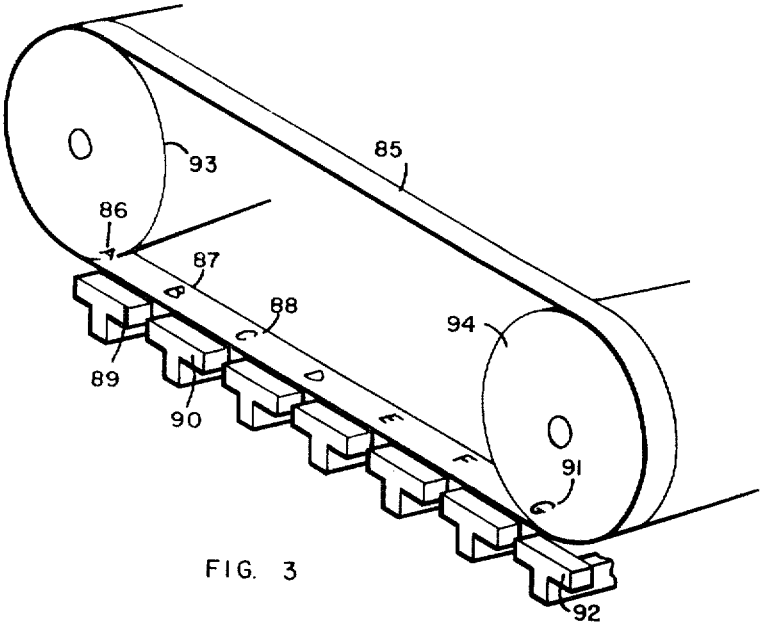
FIG. 3 shows an alternate form of type belt or chain type of configuration.

FIG. 3 shows still another arrangement wherein type belt or chain 85 is carried by wheels 93 and 94 and in turn carries type characters 86, 87, 88 through 91, etc. and is provided with multiple width hammers 89, 90 through 92. The characters 86, 87, 88 etc. in this case are not repeated whereby the length of the belt or chain is less than that of FIG. 2.

Figure 4:
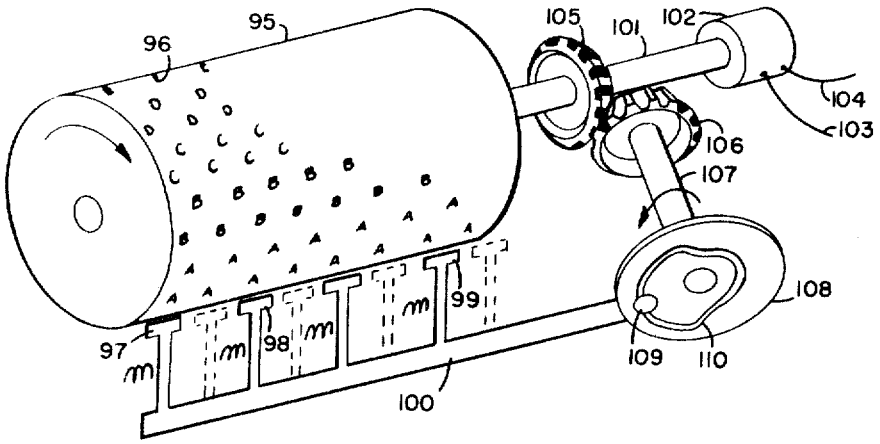
FIG. 4 shows a type drum in combination with movable column spanning hammers.

FIG. 4 shows a further modification in which type drum 95 carries type characters 96 arranged in pairs of staggered columns. Drum 95 is carried on shaft 101 and continuously rotated by motor 102 receiving power over leads 103 and 104. Hammers 97, 98 through 99 span two columns each and are shifted two columns at each second revolution of drum 95. The hammers are coupled to 100 which carries a pin 109 riding in a slot 110 of disc 108. This slot 110 is shaped so that during one half of a revolution of disc 108, bar 100 is moved to the left to position the hammers as shown by the solid lines and during the other half of the revolution are positioned to the right as shown by the dotted lines. Disc 108 is rotated once for each four revolutions of drum 95 by gear 105 on shaft 101 and gear 106 turning shaft 107 attached to disc 108. Thus, during the first two revolutions of drum 95, hammer 97 prints out the first two columns of type characters and during the third and fourth revolutions prints out the third and fourth columns of type.

Figure 5:
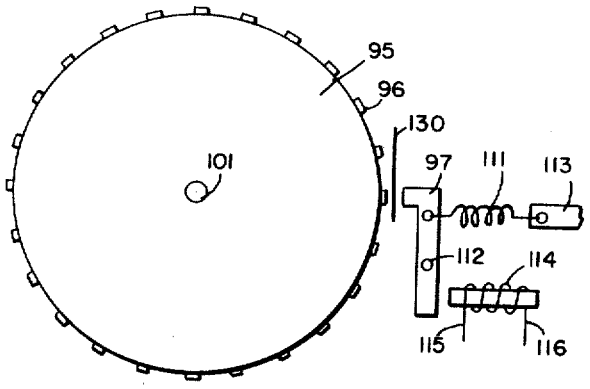
FIG. 5 shows some details of the hammer construction useful in the systems of the present invention.

FIG. 5 shows some details of a suitable hammer arrangement for use in the systems of the present invention. This is an end view and shows a typical type drum 95 carrying raised type faces 96. Hammer 97 is pivoted at 112 and is returned by spring 111 attached to frame 113. Solenoid 114 receiving power over leads 115 and 116 when energized to pull back the lower end of hammer 97, causes it head to impress one of characters 96 on a suitable medium such as pressure sensitive paper 130.

Thus it has been shown that high speed printers may utilize printing hammers with elongated heads to span more than one predetermined character printing position. Since printing in such devices is usually carried out a line at a time, the hammer heads are aligned along what may be termed the printing line. Along this line a predetermined number of equally spaced characters are to be printed. Previous printers have utilized a separate hammer for each of these predetermined character positions and the type faces on the drum or belt have been spaced by an amount also equal to the distance between these predetermined character printing positions. The printing is carried out by pressing a web to be printed upon between a hammer head and a type face on the drum or belt. This web to be printed upon may be ordinary paper in which case an inked ribbon or other suitable source of marking color may be utilized or it may be pressure sensitive paper requiring no additional source of color.

Where the type faces are carried on a drum, successive rows of type are off-set around the drum by an amount equal to a character height or slightly more so that a character in one row only may be impressed by the hammer at any given instant. In the case of a belt carrying the type faces, the type faces are spaced along the belt by some multiple of the desired adjacent printed character positions which is also equal to the length of the printing hammer head along the printing line.

While only a few forms of the present invention have been shown and described, many modifications will be apparent to those skilled in the art and within the spirit and scope of the invention as set forth in particular in the appended claims.

What is claimed is:

1. In a high speed printer, the combination of, at least two [rows] *columns* of substantially equally spaced type faces moving continuously past a printing line in a staggered offset manner for printing upon a web positioned opposite said type faces along said printing line, and a plurality of printing hammers including printing heads positioned in proximity to said printing line wherein said heads are dimensioned to span more than one column to print at a plurality of predetermined instantaneous type positions along said printing line and including control circuit means to cause a hammer to print a selected type in a selected [row] *column*.

2. In a high speed printer, the combination of, a constantly [rotary type] *rotatable* drum, an array of type faces in staggered and offset columns and rows on said constantly [rotary type] *rotatable* drum movable past a print line, and a row of printing hammers in close juxtaposition to the type faces at said printing line each hammer including a head spanning plural columns and including control circuit means to cause a hammer to print a selected type in a selected row.

3. In a high speed printer, the combination of, a [constantialy rotary type] *constantly rotatable* drum, an array of type faces in staggered and offset columns and rows on said constantly [rotary type] *rotatable* drum movable past a print line, a plurality of printing hammers including heads spanning at least two of said columns, and hammer control circuits including enabling means responsive to alternate revolutions of said drum.

4. In a high speed printer, the combination of, an array of type faces in staggered and offset columns and rows on a constantly [rotary type] *rotatable* drum movable past a print line, and a plurality of printing hammers including printing heads positioned in proximity to said printing line wherein said heads are dimensioned to span at least two discrete instantaneous type print positions along said printing line.

5. In a high speed printer, the combination of, an array of type faces in staggered and offset columns and rows on a constantly [rotary type] *rotatable* drum movable past a print line, and a plurality of individual hammers having heads spanning plural columns, and a control circuit to select a hammer to print a selected row when said type drum is in a predetermined rotational position.

6. In a high speed printer, the combination of a constantly [rotary type] *rotatable* drum carrying an array of type faces in staggered and offset columns and rows past a print line, a plurality of hammers having heads spanning plural columns for cooperating with said type faces to print on a web, and synchronized enabling circuits for controlling said hammers in accordance with predetermined instantaneous type face positions upon said rotating drum.

7. In a high speed printer the combination of, flexible carrier means supporting an array of type faces [in staggered and offset columns and rows past] *for movement past printing columns on* a print line for printing on a web, *said type faces being spaced uniformly on said carrier so that there is one type face for plural columns,* circuit means for providing signals indicating the printing positions for said type faces, and an individual printing hammer having a head spanning *said* plural columns.

[8. In a printing device, the combination of, an array of type faces in staggered and offset columns and rows fixedly attached to a means for moving said type faces continuously through a plurality of predetermined printing positions, and a printing hammer including a head spanning a plurality of said printing columns and including control circuit means to cause a hammer to print a selected type in a selected row.]

[9. In a printing device, the combination of, a movable means supporting a plurality of rows and columns of type faces, the type faces in adjacent rows being staggered and offset, means for continuously moving said faces across a predetermined printing line, and a plurality of printing hammers wherein each printing hammer includes a head spanning at least two of said columns of type and including control circuit means to cause a hammer to print a selected type in a selected row.]

10. In a high speed printer, the combination of, a rotating drum carrying a plurality of spaced columns and rows of type arranged in a staggered and offset pattern, a plurality of type hammers mounted in a row to print upon a web located between said hammers and said drum, each of said hammers including head portions to span at least two columns, and means for alternately shifting said hammers along said row in synchronism with the rotation of said drum to print from alternate columns of type and including control circuit means to cause a hammer to print a selected type in a selected row.

11. In combination, a rotary drum print wheel having formed on the surface thereof a plurality of columns of spaced characters arranged circumferentially on the surface of said wheel, each adjacent column of characters having each character displaced from the character of the adjacent columns so that with respect to the characters in the adjacent column each character lies along a longitudinal line parallel with the axis of said wheel which line falls in a space between the characters of the adjacent column, a print hammer adapted to be moved adjacent said wheel to move a medium which is to be printed upon against preselected characters on said print wheel, said hammer having a face width sufficient to span at least two of said columns, and means connected to said hammer to activate said hammer to strike the one character in print position in the columns spanned thereby.

*12. In a high speed printer of the type in which characters are printed in character spaces located in columns extending longitudinally on a web of print receiving material and in a row extending transversely of the web, the combination comprising: an array of type faces, a carrier supporting said type faces for continuous movement past said character spaces, means for driving said carrier to effect such movement, said type faces being arranged on said carrier so that said type faces are spaced in a direction parallel to said rows by a distance spanning at least two of said columns, a plurality of hammers having heads located on a print line extending parallel to the row, each of said heads spanning at least two of said columns, means to provide a signal designating the instant a selected type face registers with a selected character space, and means to actuate one of said hammers in response to said signal whereby the web receives a printed image of the character on said selected type face at the location of said selected character space.*

*13. In a high speed printer of the type in which characters are printed on a web of print receiving material in character spaces lying on a print line, the combination comprising: an endless flexible carrier, means for driving said carrier continuously in a path having a flight portion parallel to said print line, a plurality of type faces supported on said carrier for uninterrupted movement along said print line and past said character spaces thereon, a plurality of hammers having heads located on said print line, each of said hammers spanning at least two of said character spaces, means to provide a signal designating the instant a selected type face registers with a selected character space, and means to actuate one of said hammers in response to said signal whereby the web receives a printed image of a character on said selected type face at the location of said character space.*

*14. The apparatus recited in claim 13 in which the characters on said type faces are repeated in succession a number of times equal to the character space span of the head on one of said hammers.*

*15. The apparatus recited in claim 13 in which the type faces are uniformly spaced on said carrier and in which each successive type face has a different print character thereon.*

References Cited

The following references, cited by the Examiner, are of record in the patented file of this patent or the original patent.

UNITED STATES PATENTS

| | | | |
|---|---|---|---|
| 800,205 | 9/1905 | Carlson | 197—45 X |
| 1,957,167 | 5/1934 | Hoffman | 101—90 |
| 2,101,444 | 12/1937 | Miles | 101—90 X |
| 2,116,214 | 5/1938 | Robertson | 101—90 X |
| 2,669,177 | 2/1954 | London | 101—90 |
| 2,776,618 | 1/1957 | Hartley | 101—93 |
| 2,796,830 | 6/1957 | Hilton | 101—93 |
| 2,901,540 | 8/1959 | Canepa. | |
| 2,906,200 | 9/1959 | Pfleger | 101—93 |
| 2,915,967 | 12/1959 | Gehring et al. | 101—93 |
| 2,918,865 | 12/1959 | Wooding | 101—93 |
| 2,978,977 | 4/1961 | Eckert et al. | 101—93 |
| 2,990,767 | 7/1961 | Demer et al. | 101—93 |

FOREIGN PATENTS

| | | |
|---|---|---|
| 1,204,579 | 8/1959 | France. |

WILLIAM B. PENN, *Primary Examiner.*

ROBERT E. PULFREY, *Examiner.*

W. F. McCARTHY, *Assistant Examiner.*

Disclaimer

Reissue No. 26,240.—*Carl I. Wasserman*, Queens Village, N.Y. HIGH SPEED PRINTERS WITH COLUMN SPANNING HAMMERS. Patent dated July 18, 1967. Disclaimer filed Apr. 21, 1976, by the assignee, *Potter Instrument Co., Inc.*

Hereby enters this disclaimer to claims 7, 12 and 13 of said patent.

[*Official Gazette July 6, 1976.*]